United States Patent [19]

Sckolnik

[11] Patent Number: 4,568,125

[45] Date of Patent: Feb. 4, 1986

[54] CHILD SAFETY CUSHION

[76] Inventor: Anne M. Sckolnik, 39 Calumet Dr., Dix Hills, N.Y. 11746

[21] Appl. No.: 591,499

[22] Filed: Mar. 20, 1984

[51] Int. Cl.[4] ............................................ A47C 31/00
[52] U.S. Cl. ..................................... 297/467; 297/465
[58] Field of Search ...................... 297/465, 467, 464; 280/33.99 B; 248/102; 224/158, 161

[56] References Cited

U.S. PATENT DOCUMENTS

| | | | |
|---|---|---|---|
| 1,538,538 | 5/1925 | Wood | 297/465 |
| 2,303,728 | 12/1942 | Drayton et al. | 248/102 |
| 2,652,183 | 9/1953 | Hlivka | 297/465 |
| 2,988,136 | 6/1961 | Kowalczyk | 297/465 |
| 3,042,032 | 7/1962 | Vogel | 297/466 |
| 3,099,486 | 7/1963 | Scott | 297/465 |
| 3,165,358 | 1/1965 | Card | 297/465 X |
| 3,604,750 | 9/1971 | Doering | 297/465 |
| 3,713,692 | 1/1973 | McCracken | 297/465 |
| 4,050,737 | 9/1977 | Jordan | 297/465 |
| 4,166,558 | 9/1979 | Schroeder | 224/158 |
| 4,234,229 | 11/1980 | Arnold | 297/465 |
| 4,254,900 | 3/1981 | Wheeler | 224/158 |
| 4,324,430 | 4/1982 | Dimas, Jr. et al. | 297/250 |
| 4,341,421 | 7/1982 | Rowley | 297/465 |

Primary Examiner—James T. McCall
Attorney, Agent, or Firm—Hopgood, Calimafde, Kalil, Blaustein & Judlowe

[57] ABSTRACT

A child safety cushion suitable for use in a wide variety of environments. The cushion is constructed from flexible padded material and includes a back portion, side bolsters and a seat portion. The cushion may be opened flat, and in use the side bolsters snap to the seat portion to form an upstanding chair-like cushion for supporting the child. A padded tee portion may be snapped to the seat portion and the side bolsters to restrain the child. Belts and straps are provided for holding the child and for attaching the cushion to an external object. The straps permit the cushion to be secured to a shopping cart with the child sitting up or an infant laying down. The cushion may also be secured to a chair even if the chair does not have any arms. In all cases, the child will be firmly supported along the sides.

10 Claims, 6 Drawing Figures

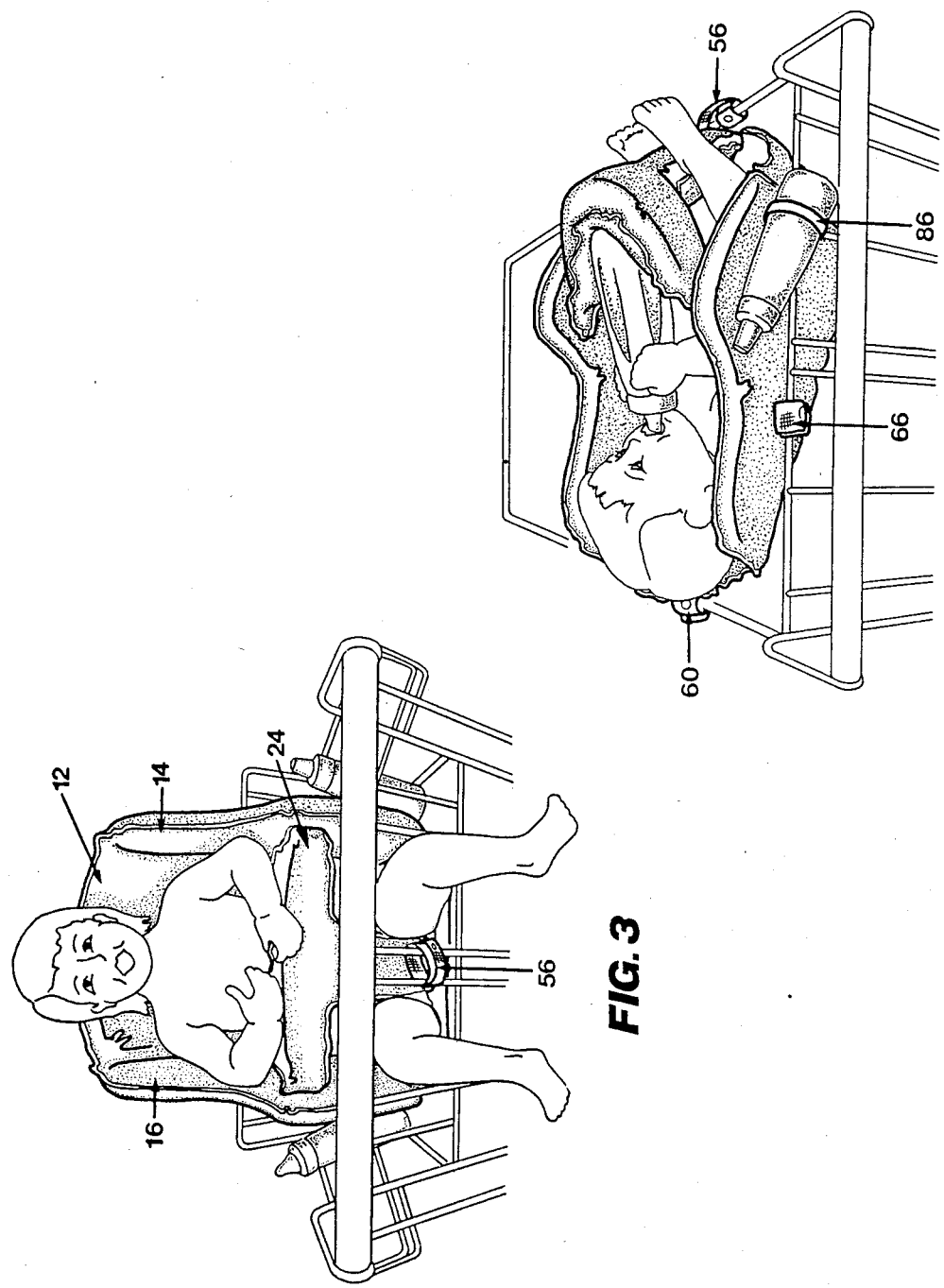

4,568,125

CHILD SAFETY CUSHION

BACKGROUND OF THE INVENTION

This invention relates generally to a safety cushion for children and specifically to a portable safety cushion which may be used in many different environments.

A number of arrangements for providing baby seats, safety cushions or child restraining devices are known in the art, such as those described in the following patents:

| U.S. Pat. No. | Inventor | Date |
| --- | --- | --- |
| 1,538,538 | Wood | May 19, 1925 |
| 2,652,183 | Hlivka | September 15, 1953 |
| 2,988,136 | Kowalczyk | June 13, 1961 |
| 3,042,032 | Vogel | July 3, 1962 |
| 3,165,358 | Card | January 12, 1965 |
| 3,604,750 | Doering | September 14, 1971 |
| 3,713,692 | McCracken | January 30, 1973 |
| 4,050,737 | Jordan | September 27, 1977 |
| 4,324,430 | Dimas, Jr. et al. | April 13, 1982 |

However, the arrangements suffer from a number of drawbacks which limit their adaptability. For example, safety cushions constructed from flexible materials generally do not provide sufficient side support for the child. Accordingly, such cushions are limited to being used in an upright position in environments which provide external side support such as chairs that include arms. Certain of the prior arrangements could not be used in a lying down position which is required for use with infants and to six months in age. Other arrangements have utilized rigid materials or have rigid frames which prevent the seat from being opened flat, increase its weight and impair its washability. The present invention is directed towards overcoming these difficulties.

SUMMARY OF THE INVENTION

A child safety cushion constructed in accordance with the present invention is formed from flexible padded material and includes a back portion having hingedly attached padded side bolsters and a seat portion. The cushion construction may be opened flat when not in use and in use is snapped together to form an enclosed seat. A padded tee may be attached across the front of the cushion to hold the baby in place. Straps disposed on various portions of the cushion permit it to be attached either vertically or horizontally to a stroller, shopping cart or to a chair either with or without arms, such as standard chairs or high chairs.

Accordingly, it is an object of this invention to provide a child safety cushion which may be utilized in a wide variety of environments.

It is another object of this invention to provide a child safety cushion that is flexible and may be opened flat, yet provide firm side support for the child.

It is another object of this invention to provide a child safety cushion that may be used for both infants and toddlers.

It is another object of this invention to provide a child safety cushion that does not require the use of a rigid framework.

It is another object of this invention to provide a child safety cushion which is lightweight and easily cleaned.

Still other objects of this invention will become apparent upon a reading of the detailed specification to follow.

BRIEF DESCRIPTION OF THE DRAWINGS

For a better understanding of the invention, reference is made to the following drawings which are to be taken in conjunction with the detailed description to follow:

FIG. 3 illustrates the safety cushion in use in the seat section of a shopping cart with a toddler positioned sitting up;

FIG. 4 illustrates the safety cushion in use in the seat section of a shopping cart with an infant in a reclining position across the cart;

DESCRIPTION OF THE PREFERRED EMBODIMENTS

The drawings illustrate a child safety cushion 10 constructed in accordance with the present invention. Safety cushion 10 includes a back portion 12, side bolsters 14 and 16 and a seat portion 18. Back portion 12, side bolsters 14, 16 and seat portion 18 are preferably constructed from vinyl covered foam of approximately two inch thickness which is lightweight yet firm enough to provide adequate side support, and easy to clean. However, other suitable materials may also be used.

Figures 1, 2:
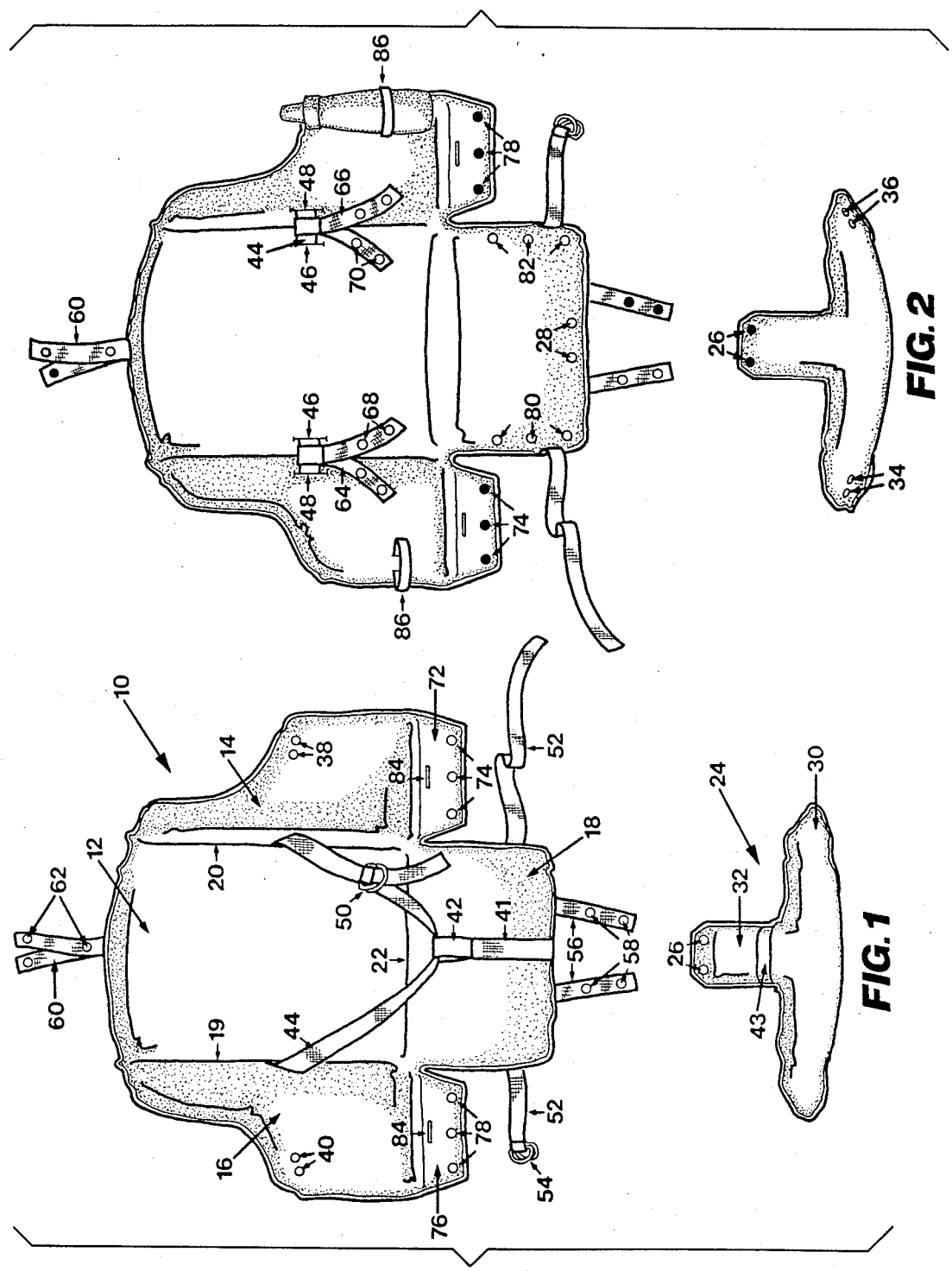
FIG. 1 is a plan view of the interior of a safety cushion constructed in accordance with the invention, when opened flat.
FIG. 2 is a plan view of the exterior of the safety cushion opened flat.

Side bolsters 14 and 16 are generally L-shaped with a narrow portion at the top and a wider portion at the bottom. Side bolster 16 is hingedly connected to back portion 12 along its outer edge 19 so that it may be opened flat for travel and storage, as shown in FIG. 1, or be extended perpendicularly with respect to back portion 12 while in use. Similarly, side bolster 14 is hingedly connected to back portion 12 along edge 20. Seat portion 18 is also hingedly connected to the lower edge 22 of back portion 12. The various portions of cushion 10 may either be formed from separate pieces or from interior and exterior pieces of cut vinyl with the foam removed along edges 19, 20 and 22 to form the hinged connections.

A cushioned "tee" portion 24 may be attached to cushion 10 by means of interengaging snap fasteners 26, 28. Tee portion 24 includes a lateral or belt portion 30 which is positioned across the child and a vertical portion 32 forming a crotch strap which will be disposed between the legs of the child to more securely restrain and cushion the child. Lateral portion 30 includes snap fasteners 34, 36 which will engage snap fasteners 38, 40 disposed on side bolsters 14, 16. The provision of multiple snap fasteners allows the fit of the tee portion to be adjusted to accommodate children of various sizes. The snap attachment of tee portion 24 to cushion 10 permits its optional use. The use of tee portion 24 is particularly desirable where small infants requiring greater restraint and protection are to be carried. However, tee portion 24 may be removed and the straps and belts described below may alone be used to secure the child.

Attached to the lower edge of seat portion 18 is a crotch strap 41 which has a loop 42 at its free end. Crotch strap 41 passes through a strap 43 on tee portion 24 for mutual connection. A belt 44 passes through loop 42 on crotch strap 41 to be secured around the waist of the child. Belt 44 passes through slots 46 at the exterior of back portion 12 and slots 48 provided in side bolsters 14, 16. A D-ring 50 or other type of fastener is used to secure belt 44 about the child.

A belt 52 is attached to the sides of seat portion 18 which is to be wrapped around a chair to hold safety cushion 10 securely in place. A D-ring 54 or other type of fastener is attached to one end of belt 52 to secure same. Short straps 56 extend from the bottom of seat portion 18 and include interengaging snap fasteners 58. Straps 56 are used to secure cushion 10 to a shopping cart as shown in FIGS. 3 and 4. Similarly, straps 60 carrying snap fasteners 62 extend from the top of back portion 12. Straps 64, 66 having snap fasteners 68, 70 are attached to belt 44 at the exterior of back portion 12. Straps 56, 60, 64 and 66 are used to attach safety cushion 10 to a shopping cart in a horizontal position, as shown in FIG. 4, which permits the child to recline laterally across the shopping cart. This arrangement is particularly suitable where small infants are to be carried.

Extending from the lower edge of side bolster 14 is a flap 72 carrying snap fasteners 74. Similarly, extending from the lower edge from side bolster 16 is a flap 76 carrying snap fasteners 78. In use, side bolsters 14, 16 and seat 18 are disposed standing upwardly from back portion 12. Snap fasteners 74, 78 are then snapped to snap fasteners 80, 82 disposed along the underside of seat portion 18 which forms a cushioned chair for the child. Snap fasteners 80, 82 are positioned on the underside of seat portion 18 to increase the strength of the connection and to prevent the child's access to the fasteners. Flaps 72, 76 include slots 84 through which belt 52 passes which further serve to hold the assembly together. Disposed at the exterior portion of side bolsters 14, 16 are elastic straps 86 which may be used to hold a baby bottle.

Figure 5B:
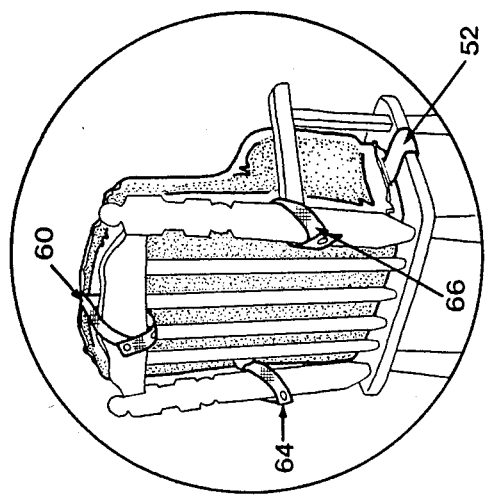
FIG. 5 is a front and rear view of the safety cushion attached to a chair having arms, such as a high chair.
Figure 5A:
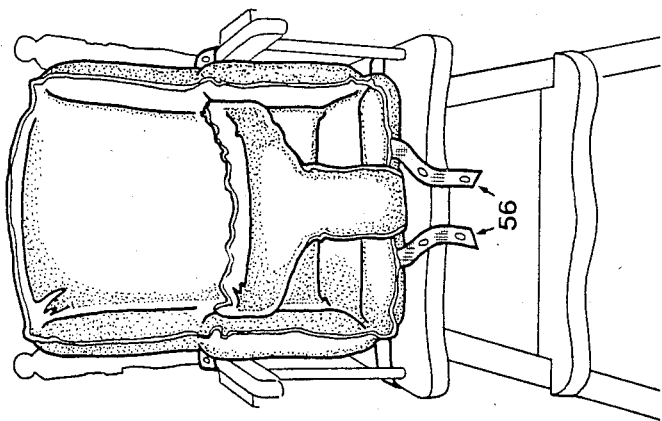
Figure 6B:
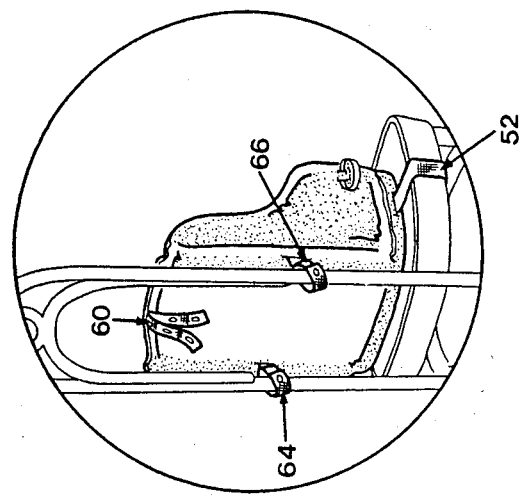
FIG. 6 is a front and rear view of the safety cushion attached to an armless chair.
Figure 6A:
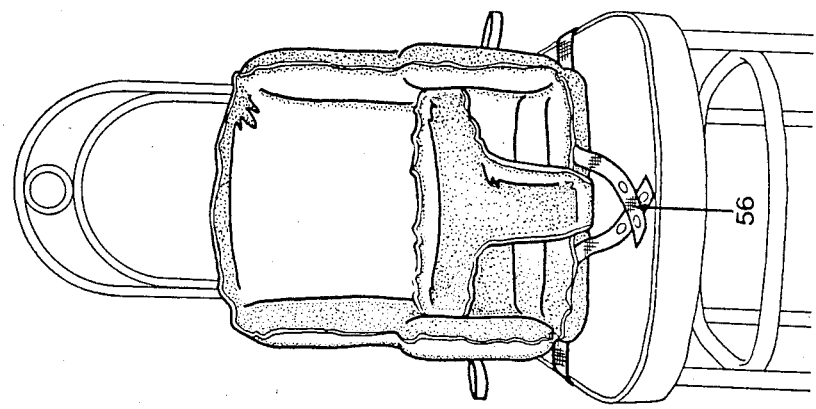

FIGS. 3 through 6 illustrate the wide variety of applications possible with child safety cushion 10. The provision of multiple straps 56, 60, 64, 66 and belt 52 permits the user to securely attach cushion 10 to any available part of a wide variety of external objects, which obviates the need for special cushions for special environments. FIG. 3 illustrates the cushion attached in a sitting position to a shopping cart suitable for carrying toddlers. FIG. 4 illustrates the attachment of the cushion laterally in the shopping cart with the infant in a reclining position, an arrangement particularly suitable for carrying infants. FIG. 5 shows the attachment of the safety cushion 10 to a chair which includes arms such as a high chair. FIG. 6 illustrates safety cushion 10 attached to a chair which does not include side arms such as a standard chair. The provision of side bolsters 14, 16 will prevent the child from falling sideways out of the chair. In each of these positions, the use of the tee portion 24 is optional depending on the size of the child and the secureness of fit desired.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. A child safety cushion comprising:
   a flexible padded back portion having upper, lower and side edges;
   flexible padded side bolsters hingedly connected to said side edges of said back portion;
   a flexible padded seat portion hingedly connected to the lower edge of said back portion;
   means for releasably fastening said side bolsters to said seat portion to permit said side bolsters and said seat portion to be disposed upstanding from said back portion;
   lateral belt means including fastening means for engagement around the waist of a child;
   crotch step means, extending from said seat portion and joining said lateral belt means to prevent a child from sliding out of said cushion; and
   strap means for attaching said cushion to an external object.

2. The child safety cushion as claimed in claim 1, wherein said strap means include straps disposed at the lower edge of said seat portion and the upper edge of said back portion, said strap means including releasable connectors to thereby permit said cushion to be attached to an external object.

3. The child safety cushion as claimed in claim 1, wherein said strap means include straps disposed at the rear side edges of said back portion, said side straps including releasable fasteners to permit said cushion to be attached to an external object.

4. The child safety cushion as claimed in claim 1, wherein said seat portion includes belt means extending laterally therefrom to permit attachment of said safety cushion to an external object.

5. The child safety cushion as claimed in claim 1, wherein said crotch strap means include a loop through which said belt portion may pass.

6. The child safety cushion as claimed in claim 1, wherein said lateral belt means and said crotch strap means are formed from T-shaped flexible padded material and include releasable fastening means for adjustable attachment to said side bolsters and said seat portion.

7. The child safety cushion as claimed in claim 1 wherein said lateral belt means and said crotch strap means comprise webbing straps.

8. The child safety cushion as claimed in claim 1, wherein said side bolsters include elastic loop means for holding a baby bottle.

9. The child safety cushion as claimed in claim 1, wherein said side bolsters include a lower edge and said means for releasably fastening said side bolster to said seat portion comprise flap means joined to said lower edge of said side bolster, said flap means carrying releasable connector means for interconnection with releasable connector means carried by said seat portion.

10. The child safety cushion as claimed in claim 1, wherein said side bolsters are generally L-shaped with a wide portion disposed proximate to said seat portion and a narrow portion disposed distally from said seat portion.

* * * * *